Jan. 20, 1953  W. W. SMITH  2,626,038
APPARATUS FOR ASSEMBLING STORAGE BATTERY ELEMENTS
Filed April 12, 1949  8 Sheets-Sheet 2

Fig. 2

INVENTOR.
William Wharton Smith
BY
Edward J. Dwyer
ATTORNEY

Jan. 20, 1953      W. W. SMITH      2,626,038
APPARATUS FOR ASSEMBLING STORAGE BATTERY ELEMENTS
Filed April 12, 1949      8 Sheets-Sheet 3

Fig. 3

INVENTOR.
William Wharton Smith
BY
Edward J Dwyer
ATTORNEY

Jan. 20, 1953 — W. W. SMITH — 2,626,038
APPARATUS FOR ASSEMBLING STORAGE BATTERY ELEMENTS
Filed April 12, 1949

*INVENTOR.*
William Wharton Smith
BY
ATTORNEY

Jan. 20, 1953 W. W. SMITH 2,626,038
APPARATUS FOR ASSEMBLING STORAGE BATTERY ELEMENTS
Filed April 12, 1949 8 Sheets-Sheet 5

*INVENTOR.*
William Wharton Smith
BY
*ATTORNEY*

Jan. 20, 1953 W. W. SMITH 2,626,038
APPARATUS FOR ASSEMBLING STORAGE BATTERY ELEMENTS
Filed April 12, 1949 8 Sheets-Sheet 6

INVENTOR.
William Wharton Smith
BY
ATTORNEY

Jan. 20, 1953 W. W. SMITH 2,626,038
APPARATUS FOR ASSEMBLING STORAGE BATTERY ELEMENTS
Filed April 12, 1949 8 Sheets-Sheet 7

INVENTOR.
William Wharton Smith
BY
ATTORNEY

Patented Jan. 20, 1953

2,626,038

UNITED STATES PATENT OFFICE 2,626,038

APPARATUS FOR ASSEMBLING STORAGE BATTERY ELEMENTS

William Wharton Smith, Philadelphia, Pa., assignor to The Electric Storage Battery Company, a corporation of New Jersey Application April 12, 1949, Serial No. 86,922

22 Claims. (Cl. 198—35)

This invention relates to apparatus for assembling elements, more particularly elements comprising plates and separators of storage batteries, and has for an object the provision of improvements in the methods of and apparatus for automatically stacking or assembling in proper order the plates and separators to form battery elements including any desired number of plates.

It has heretofore been proposed to provide single or double suction heads which may be raised and lowered and jointly moved between registered positions with stack piles of positive and negative plates and separators into registered positions with a conveyor for the automatic assembling of the various components of storage battery elements. Such systems are disclosed in copending application Serial No. 86,882, filed April 12, 1949, by Charles Douglas Galloway, and assigned to the assignee of the present invention. These systems are advantageous in greatly increasing the speed of assembly of storage battery elements, but the effective floor space thereof becomes unduly great for storage battery elements of eleven, fifteen and seventeen plates. Accordingly, it is an object of the present invention to provide an apparatus for assembling storage battery elements in which the magazines and their stack piles may be bodily moved relative to the suction heads to bring into successive registration therewith, and in the correct order, the plates and separators of each element.

In carrying out the present invention in one form thereof, after a suction head has lifted a plate from a supply magazine, there is relative movement between the two to bring the suction head into registration with a different supply magazine for removal of a separator therefrom. By providing two supply magazines on opposite sides of a supporting platform or conveyor in association with a pair of suction heads, a complete storage battery element may be assembled with any number of plates with separators interposed therebetween, the total number being determined by the number of cycles of operation of the suction heads and of the relatively movable magazines.

Inasmuch as the first and last operations on a storage battery element ordinarily comprise the delivery of a negative plate, provision is made to suspend only the lowering operation of the suction heads after the final negative plate has been deposited on a storage battery element. During that time interval the completed element is moved from the assembly station to a discharge station. By providing timed control of the cycle, the lowering of the suction heads is resumed at that point in the cycle which results in the delivery at the assembly station of a negative plate to initiate the assembly of a further storage battery element. In one form of the invention, the suction heads are latched in their uppermost positions to eliminate interference with other parts of the machine during transport of a completed element or elements from the assembling machine.

For further objects and advantages of the invention, and for other patentable features thereof, reference is to be had to the following description taken in conjunction with the accompanying drawings in which:

Fig. 9-A is a fractional view of the magazines and their driving structure;

Before describing the details of the machine and the manner in which the several operations are carried out to complete the assembly of storage battery elements, there will be presented a description of the operations to be performed, it being understood, of course, that the particular mode of performing each operation may be varied according to the particular applications to be made of the invention.

Referring to Figs. 4-8, a pair of suction heads 10a and 11a are shown laterally spaced and connected together by a crosshead 12a, the suction head 10a being in registry above a magazine 13a for a stack pile of negative plates 14, while the suction head 11a is in registry over a conveyor 15, or movable platform. Magazines 16a, 17a and 18a are provided, respectively, for a stack pile of positive plates 19 and stack piles of separators 20 and 21. As illustrated, magazines 13a and 16a are located at the left side of conveyor 15, as viewed in Figs. 4-8, and magazines 17a and 18a are located at the right side of conveyor 15. The lateral spacing of the suction heads 10a and 11a and the lateral spacing of each magazine from the conveyor 15 are such that one suction head may register with the conveyor while the other suction head registers with a magazine. In other words, the suction heads 10a and 11a are spaced one from the other a distance equal to the extent of their joint transverse movement.

Figure 4:
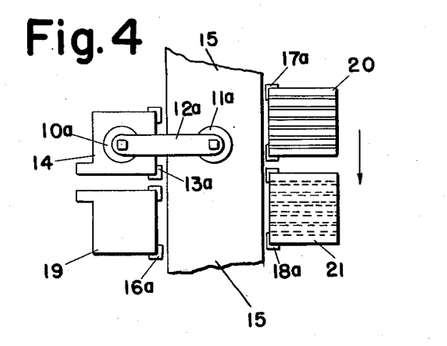
Figs. 4–8 inclusive are diagrammatic plan views illustrating the sequence of operations in assembling a storage battery element.

As the suction heads 10a and 11a arrive in their registered positions of Fig. 4, they are lowered. The suction head 10a engages the uppermost negative plate 14, and the suction head 11a is lowered to conveyor 15. Suction is applied to the suction head 10a, and thereafter the crosshead 12a is elevated to lift the suction heads 10a and 11a, the former carrying with it a negative plate which is later identified as 14a. When the suction heads 10a and 11a approach their uppermost positions, they and their crosshead 12a are moved in a fixed transverse path across the conveyor 15 until, Fig. 5, the plate 14a is in registered position above it. The suction heads 10a and 11a are then lowered and after the plate 14a arrives at, or is placed upon, the conveyor 15, suction is released to disengage the plate 14a from the suction head 10a.

Figure 5:
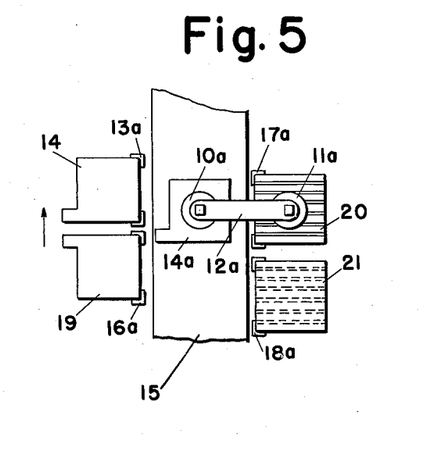

In Fig. 4, the magazines 13a and 16a for the stack piles of negative plates 14 and the stack piles of positive plates 19 are stationary, but the magazines 17a and 18a mounted on a common frame are moving downwardly as indicated by the arrow. They are brought to rest prior to the completion of the movement of suction heads 10a and 11a to their right-most positions as shown in Fig. 5 preparatory to the lowering of the suction heads. When the suction head 10a deposits the negative plate 14a on the conveyor 15, the suction head 11a is lowered into engagement with the uppermost separator 20a of the stack pile 20. When suction is removed from the suction head 10a to deposit the negative plate 14a on the conveyor 15, suction may be applied to the suction head 11a for removal of separator 20a from the stack pile in magazine 17a. Inasmuch as the negative plate has been described as first being deposited on the conveyor 15, the stack pile of separators 20 has been illustrated with the separator grooves facing upwardly, it being preferred that the flat side of a separator shall rest against the negative plate.

Figure 6:
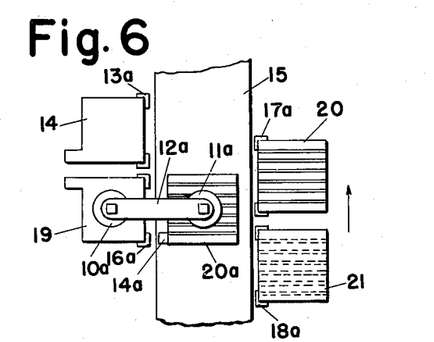

After elevation of the suction heads 10a and 11a from their positions as shown in Fig. 4, the magazines 13a and 16a, together with their stack piles of negative plates 14 and positive plates 19, are moved upwardly to bring the stack pile of positive plates 19 into registered position with the transverse path of movement of the suction heads 10a and 11a across the conveyor 15. Accordingly, after elevation of the suction heads 10a and 11a from their lowered positions in Fig. 5, they are moved to the left, the empty suction head 10a then being moved into registered position over the stack pile of positive plates 19 as shown in Fig. 6, while the separator 20a which was removed from the stack pile 20 is registered over the conveyor 15 above negative plate 14a. Separator 20a is then deposited on the conveyor in the same manner as described for the negative plate 14a, while the suction head 10a is lowered onto the stack pile of positive plates 19. As before, suction is applied to the head 10a while it is removed from the suction head 11a to leave on the negative plate 14a the separator 20a and to lift from the stack pile 19 a positive plate 19a.

Figure 7:
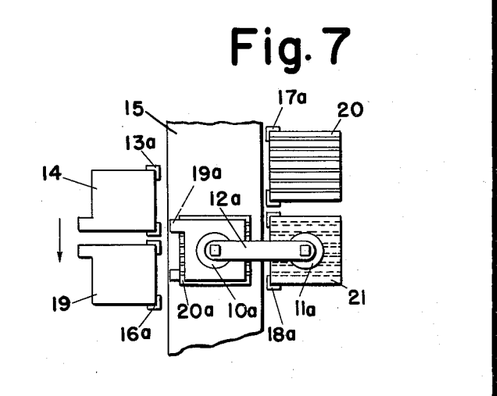

After the elevation of the suction heads 10a and 11a from their lowered positions shown in Fig. 5, the magazines 17a and 18a are moved upwardly to move the stack pile of separators 21 into registered position with the transverse path of travel of the suction heads across the conveyor 15, the final position being shown in Fig. 7.

The foregoing operations as regards the suction heads 10a and 11a are then repeated for deposit on the separator 20a of the positive plate 19a while the suction head 11a lifts from the stack pile 21 a separator 21a. The separators have been shown with their grooves facing downwardly, in order that the flat side of the separator shall again engage the negative plate next to be delivered.

After elevation of the suction heads 10a and 11a from their lowered positions shown in Fig. 6, the magazines 13a and 16a are moved downwardly to bring the stack pile of negative plates 14 again into registration with the movement of suction heads 10a and 11a against the conveyor 15. As the separator 21a is deposited on the partially assembled storage battery element on conveyor 15, Fig. 8, the suction head 10a is lowered into engagement with the stack pile of negative plates 14 for subsequent removal of a negative plate in manner described in connection with Fig. 4.

The foregoing operations are continued to build up a storage battery element having the requisite number of component parts. When the requisite number of component parts has been stacked, with a high degree of accuracy, on the conveyor 15, the suction heads 10a and 11a are preferably held in their uppermost positions while the conveyor or movable platform 15 is actuated to transport the assembled element from the illustrated assembly station to an unloading station.

The assembling operation is again initiated and continued to complete the assembly of further storage battery elements in manner already described. For greater production, there may be provided additional pairs of suction heads corresponding with heads 10a and 11a, and additional magazines corresponding with 13a, 16a-18a, for simultaneous assembly of as many storage battery elements as may be desired.

In most cases, the storage battery elements will be started with a negative plate and will be completed with a negative plate. Provision is made, as will be explained more in detail hereinafter, as to how the suction heads deposit from a stack pile the negative plate to complete a storage battery element and thereafter function to deposit on the conveyor another negative plate from the same stack pile to initiate the assembly of the next storage battery element.

With the above understanding of the basic operations performed, reference will now be had to a preferred form of apparatus and the manner in which the aforesaid operations are continuously and automatically performed.

Figures 9, 10:
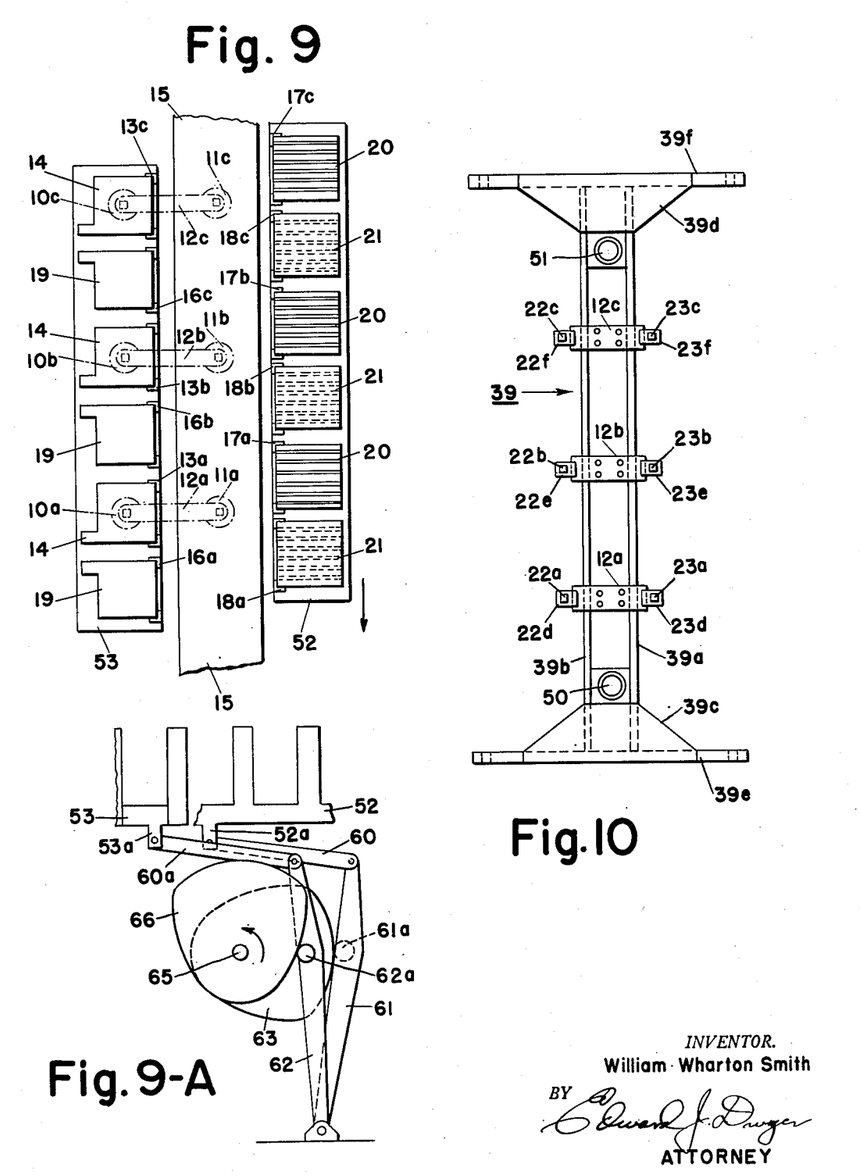
Fig. 9 is a diagrammatic plan view of the conveyor and the movable platforms for stack piles of storage battery element components in number for simultaneous assembly of three storage battery elements.
Fig. 10 is a plan view of the vertically movable crosshead through which extends the tubular elements of the three pairs of suction heads shown in Fig. 9.

In the apparatus of Figs. 1–17, there have been shown three pairs of suction heads, 10a, 10b and 10c, along one side of the apparatus, and 11a, 11b and 11c along the other side of the apparatus, Fig. 9. The suction heads are each secured to rectangular tubular elements, the tubular elements 22a, 22b and 22c being provided for the suction heads 10a, 10b and 10c, and the tubular elements 23a, 23b and 23c being provided for the suction heads 11a, 11b and 11c. Each tubular element extends through an anti-friction bearing secured to a frame 24, Figs. 1–3, supported from four arms 25–28 pivoted at 29–32, and having cam followers 25a–28a carried by lower extensions, the cam followers bearing against cams 33 and 34. Rotation of the cams 33 and 34 simultaneously rotate the arms 25–28, the upper ends thereof being pivotally connected at 35–38 to arms 24a–24d which extend outwardly from the center channel-section of the frame 24. It is the cams 33 and 34 and their associated cam followers 25a–28a, and the frame 24 which produce the transverse movement of the suction heads across the movable platform or conveyor 15. The frame 24 is made up of two channel members welded together along the flanges thereof, the arms 24a–24d being welded thereto.

Though the vertical movement of the suction heads 10a–10c and 11a–11c will later be described more in detail, it will be helpful to point out at this time that each of the tubular elements 22a–22c and 23a–23c is provided with a frictional driving device, these being identified as 22d–22f and 23d–23f. As shown in Fig. 10, each frictional device is secured to a crosshead which is, in turn, secured to a main crosshead frame 39. The frictional devices 22d–22f are secured to the respective corresponding ends of crossheads 12a–12c, while the frictional devices 23d–23f are secured to the opposite ends of crossheads 12a–12c. The crosshead frame 39 comprises, Fig. 10, a pair of rectangular bars 39a and 39b extending lengthwise of the apparatus. At the ends there are secured thereto gusset plates 39c and 39d to which are secured, as by welding or by bolts, the outwardly extending crosslinks 39e and 39f, the ends of which are respectively pivoted at 40a–43a to the four arms 40–43, Figs. 1–3. The crossheads 12a–12c are secured to angles 39g–39i as by cap screws, the angles themselves being welded or otherwise secured between the bars 39a and 39b.

The lower ends of the arms 40–43 are pivotally secured at 40b–43b to the ends of four crank arms 44–47 respectively secured to and driven by the shafts 48 and 49 extending longitudinally of the machine. The shafts 48 and 49 are driven at the same speed periodically to raise and lower the crosshead frame 39. The crosshead frame 39 is guided in its movement by a pair of cylindrical tubular guides 50 and 51 secured to and extending upwardly from the frame 24. The vertically reciprocating movement of the crosshead frame 39, together with the crossheads 12a–12c and their associated frictional devices carried thereon, controls the raising and lowering of the suction heads 10a–10c and 11a–11c.

Mounted upon supporting platforms 52 and 53 are the hoppers or magazines, the two of them, the magazines 13a and 16a associated with suction head 10a, being on one side of the machine as shown in Figs. 4–9. Magazines 13a and 16a are arranged to receive respective stack piles of negative plates 14 and positive plates 19. On the opposite side of the machine from the conveyor or platform 15 are the magazines 17a and 18a, associated with suction head 11a, respectively for stack piles of separators, the first pile 20 being with the grooves facing upwardly and the other stack pile 21 with the grooves facing downwardly. As shown in Fig. 9, there are four corresponding magazines associated with the remaining pairs of suction heads 10b and 11b and 10c and 11c. The magazines 13b and 13c are for negative plates, magazines 16b and 16c for positive plates, while the magazines 17b and 17c are for separators with the grooves facing upwardly and magazines 18b and 18c are for stack piles of separators with the grooves facing downwardly. The platforms 52 and 53, respectively supporting the stack piles of plates and separators, are slidably mounted, Figs. 2 and 3, on ways 58 and 59 supported from the frame F, the movement of each supporting platform being under the control of its own actuating mechanism, later to be described.

Figure 1:
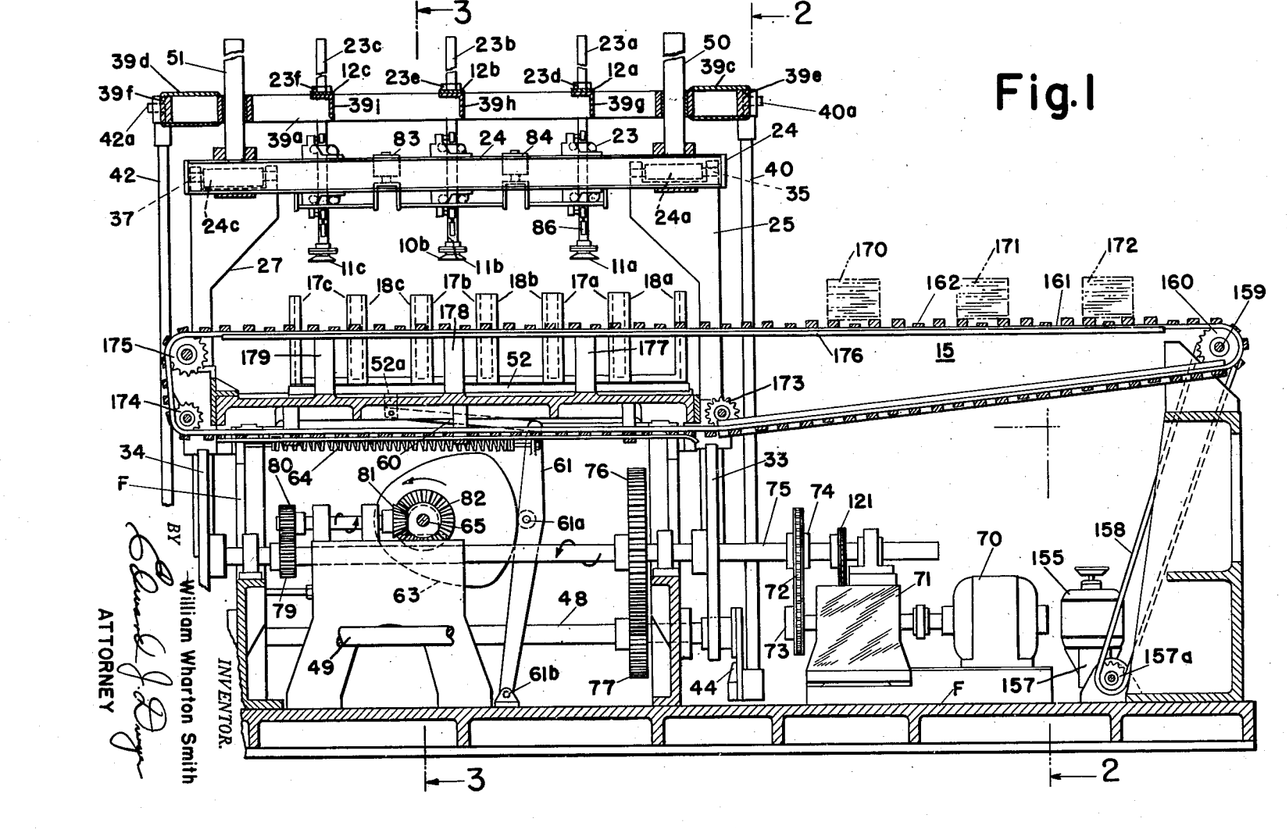
Fig. 1 is a sectional elevation of the apparatus for assembling storage battery elements taken on the line 1—1 in Fig. 2 but with a part of the driving mechanism and both intermediate suction heads appearing therein in full line.
Figure 3:
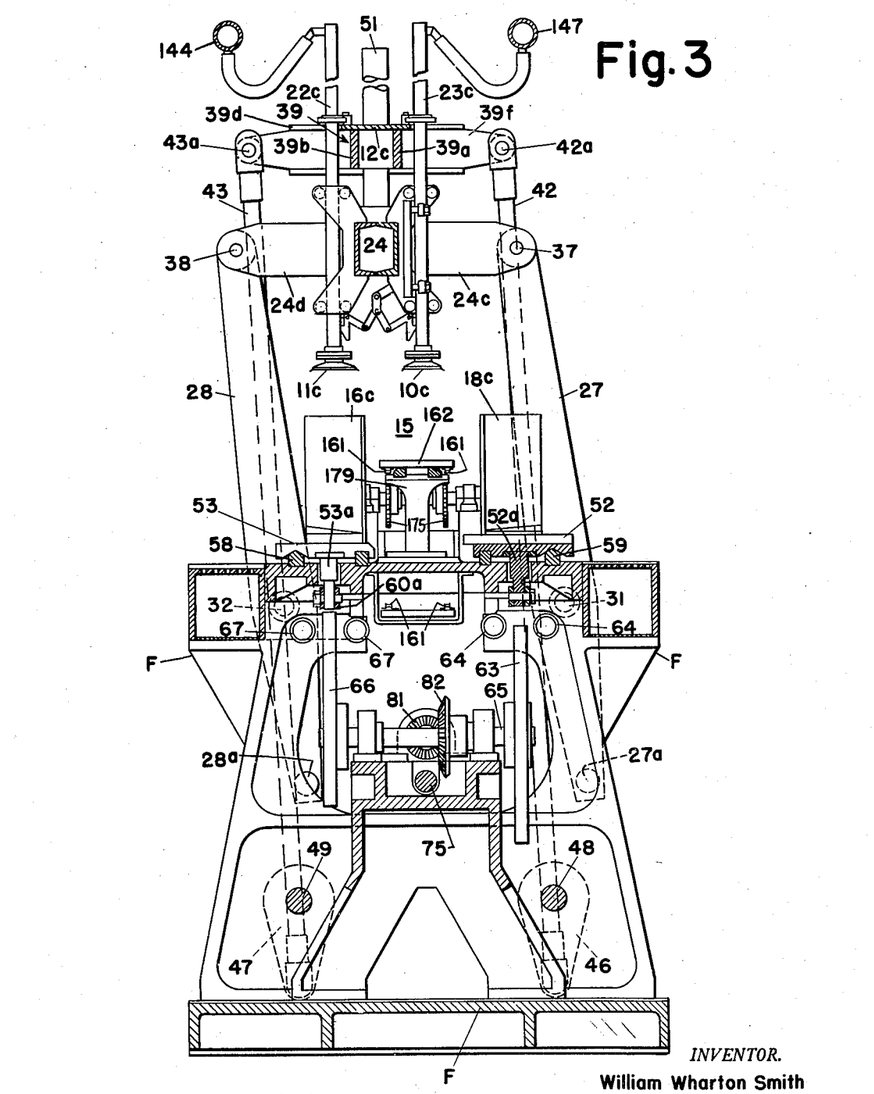
Fig. 3 is a sectional view taken along the line 3—3 in Fig. 1.

Referring to Figs. 1 and 3, it will be seen that there extend downwardly from the magazine platforms 52 and 53 extensions 52a and 53a to which there are pivoted at corresponding ends thereof operating links 60 and 60a, these links being pivotally connected at their opposite ends to actuating levers 61 and 62, Fig. 9–A, pivoted at their lower ends to the frame F about a common axis and carrying intermediate their ends cam followers 61a and 62a which are respectively held against the cam surfaces of cams 63 and 66 by pairs of tension springs 64 and 67 connected to the upper portions of the actuating levers 61 and 62 and to the frame F. The cams 63 and 66 are secured to a shaft 65 journaled in the frame, the cams being angularly displaced one from the other by ninety degrees.

The angular displacement of cams 63 and 66, of identical shape, provides for movement of one magazine platform 52 while the other platform 53 remains stationary, and vice versa, in the manner described in connection with the movement of the magazines of Figs. 4–8.

Figure 2:
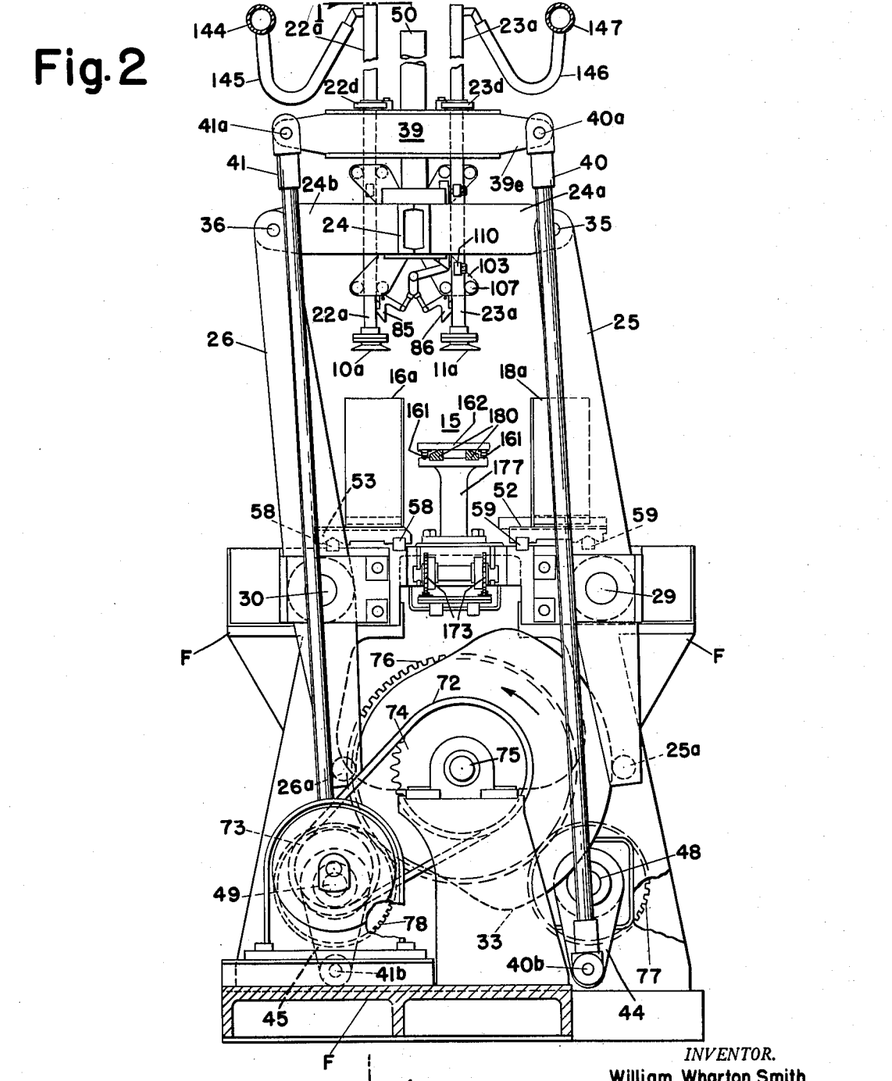
Fig. 2 is a sectional end view taken along the line 2—2 in Fig. 1.

The operating cams 33, 34, 63, 66 and crank arms 44–47, which have heretofore been described, are driven in any suitable manner, such as by a motor 70, through suitable reduction gearing indicated by gear box 71 and by a chain 72 carried by sprockets 73 and 74. The gear ratio is such that the main drive shaft 75, to which is secured the sprocket 74 and the cams 33 and 34, Fig. 1, rotates one revolution in a predetermined time, such as approximately two and one-half seconds. The speed of this shaft, though not critical, has been set forth for clarity in describing the timed or synchronized operation of the several parts. The shafts 48 and 49, Fig. 2, are driven from the main shaft 75 by a gear 76 which meshes with gears 77 and 78 respectively secured to the shafts 48 and 49. The gear ratio is such that the shafts 48 and 49 rotate one revolution in one and one-quarter seconds. In this connection, it is to be recalled that the shafts 48 and 49 drive the crank arms 44–47 for the raising and lowering of the suction heads.

The cams 63 and 66 secured to the shaft 65 are also driven from the main shaft 75 through a gear train including gears 79, 80, 81 and 82, the gear ratio being such that shaft 65 completes one revolution in five seconds.

Figure 11:
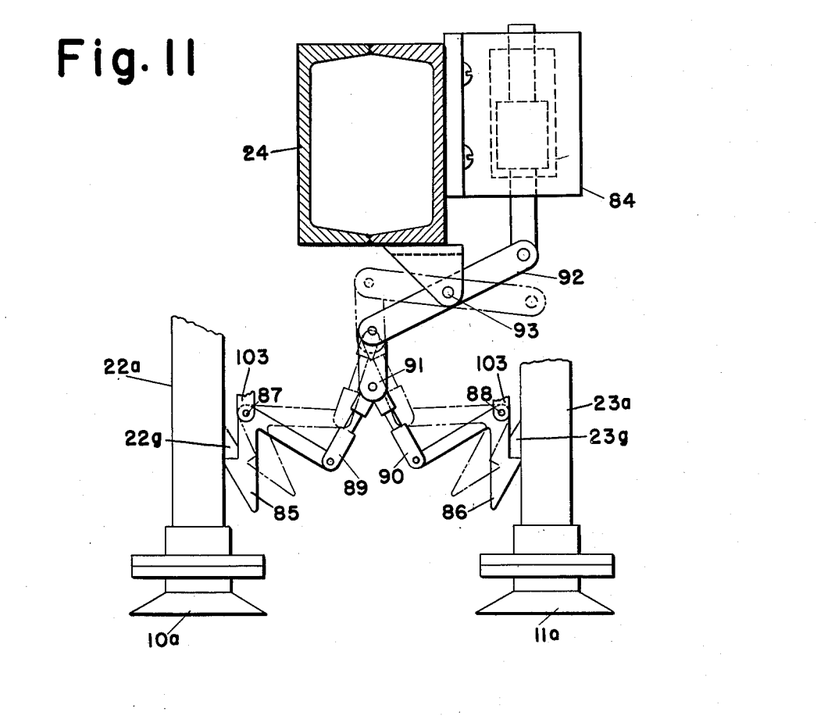
Fig. 11 is an enlarged view, partly in section, of the latching arrangement for a pair of suction heads with the latching mechanism shown in two positions.
Figure 12:
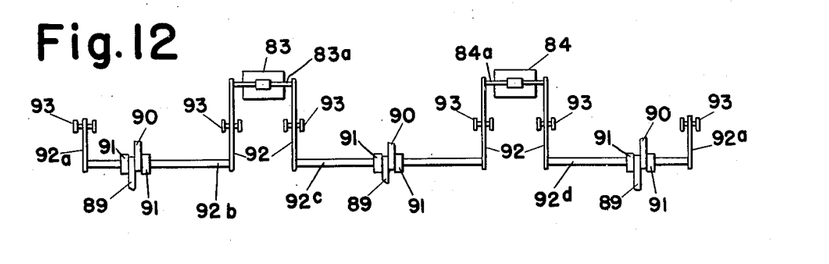
Fig. 12 is a partial plan view of the latching mechanism of the apparatus of Fig. 1 looking upwardly from the conveyor.
Figure 17:
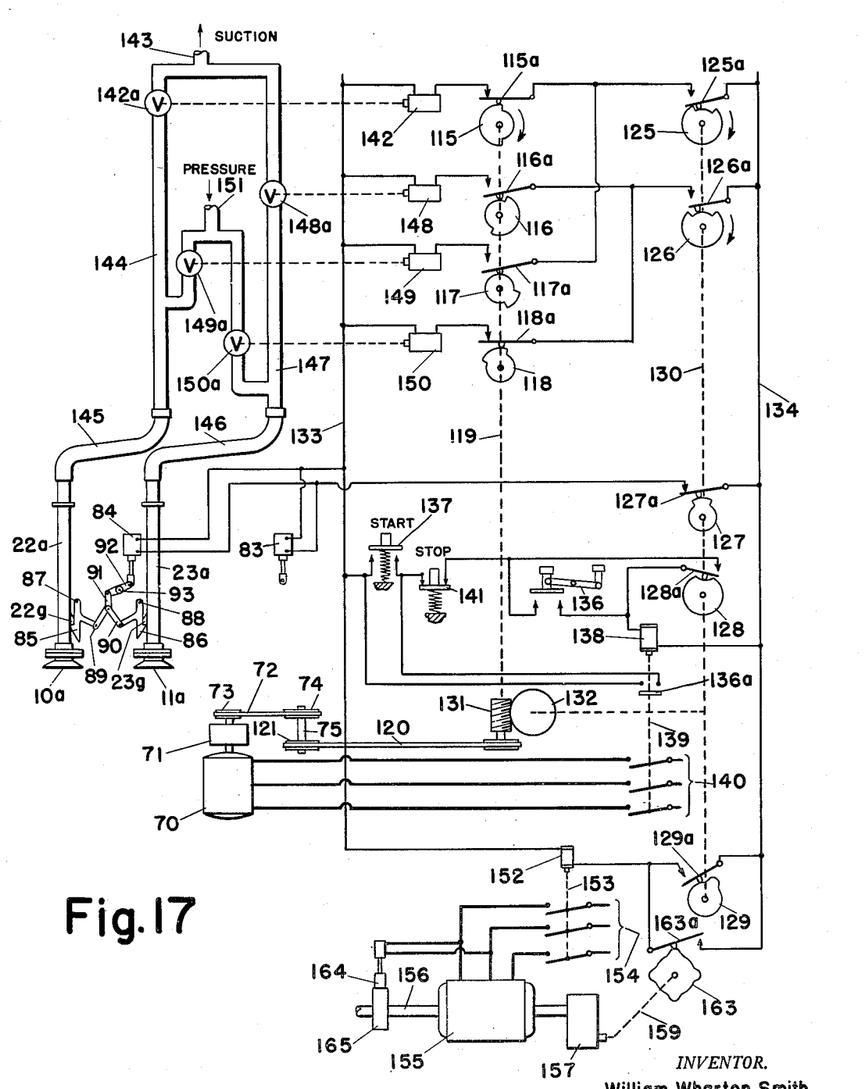
Fig. 17 diagrammatically illustrates the electrical control circuit, the fluid-control system, together with associated mechanical elements.

As shown in Figs. 1–3, 11 and 17, the suction heads are latched in their uppermost positions by reason of the energization of a pair of solenoids 83 and 84, the latching arrangement being provided for purposes of repeating a cycle to pick up a second negative plate in manner which will later be explained and which has already been briefly referred to in Figs. 4–8. The latching mechanism for each pair of suction heads is identical and, therefore, only the latching mechanism shown in connection with the pair of heads 10a and 11a will be referred to in detail. This mechanism is diagrammatically shown in Fig. 17 and in the enlarged detail view of Fig. 11 where it will be seen that each of tubular elements 22a and 23a has shoulders 22g and 23g beneath which extend latching elements or pawls 85 and 86, the pawls being pivoted at 87 and 88 to extensions of the subframes 103. The pawls 85 and 86 have integral crank arms to which there are respectively pivoted the links 89 and 90, these being pivotally connected at corresponding ends to a link 91 secured to a rocker arm 92 pivoted at 93 and operable by the solenoids, one of which, the solenoid 84, is shown in Figs. 11 and 17. As shown in Fig. 11 the solenoid 84 is mounted on frame 24 and may be secured thereto by any suitable means, as by cap screws. Both solenoids 83 and 84, Fig. 17, are operated by the same control circuit and both function together, as shown in Fig. 12 simultaneously to operate the pawls associated with the respective pairs of suction heads. More particularly, there extend from the armatures of solenoids 83 and 84 pins or rods 83a and 84a to which are pivoted corresponding ends of rocker arms 92. Between their opposite ends and the ends of idler arms 92a there extend pins or rods 92b, 92c and 92d. The idler arms 92a have their opposite ends pivoted at 93 from the frame 24 (not shown in Fig. 12). Each link 91 extends downwardly as viewed in Fig. 11 in the region of each associated pair of suction heads. Each link 91 has bifurcated ends between which rest the links 89 and 90 leading to the crank arms of the respective pawls, such as 85 and 86 of Fig. 11, the operation of which has already been described.

With the solenoids 83 and 84 energized as shown in Fig. 17 and by the solid line in Fig. 11, the latching elements are maintained in latching position. Upon deenergization of solenoids 83 and 84, all latching pawls are moved to releasing position. For example, the pawls 85 and 86 are moved from beneath the shoulders 22g and 23g, as shown by the dotted lines in Fig. 11, to unlatch the tubular elements 22a and 23a. Suitable biasing springs may be provided, but ordinarily the weight of the movable elements of the solenoids 83 and 84 will provide adequate gravity bias to move all pawls, including 85 and 86, to their releasing positions. With the latches released, descent or downward movement of the crosshead frame 39 will be effective in lowering the tubular elements and their associated suction heads by reason of the friction developed on them by the frictional devices carried by the crosshead. These frictional devices 22d–22f and 23d–23f are of identical construction and only the frictional device 23d for tubular element 23a will be described in detail.

Figure 13:
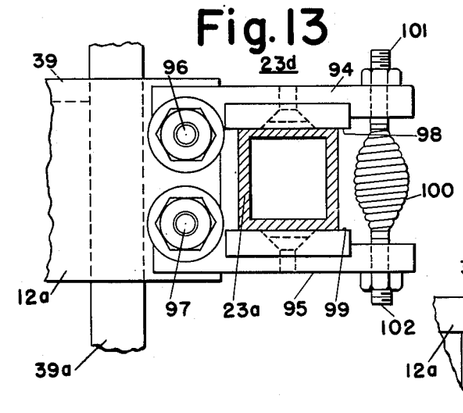
Fig. 13 is an enlarged plan view of one of the friction devices for the several tubular elements.
Figure 14:
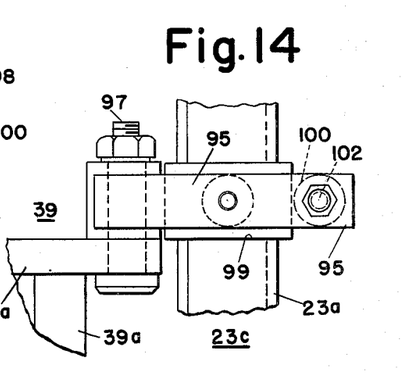
Fig. 14 is a side elevation of Fig. 13 taken from below.

Referring now to the enlarged detail views thereof, Figs. 13 and 14, it will be observed that to the crosshead 12a are pivotally mounted arms 94 and 95 as by pivots 96 and 97, the respective arms having friction blocks 98 and 99 secured thereto for gripping engagement with the tubular element 23a. The arms are pressed against the tubular element 23a by a tension spring 100 secured to through-bolts 101 and 102 respectively extending through the arms 94 and 95. By tightening the nuts on the ends of the through-bolts the pressure of the spring on the two arms may be adjusted as desired for the development of the required amount of friction on the tubular element 23a to which the suction head 11a is secured, Figs. 1, 2 and 10.

Figure 15:
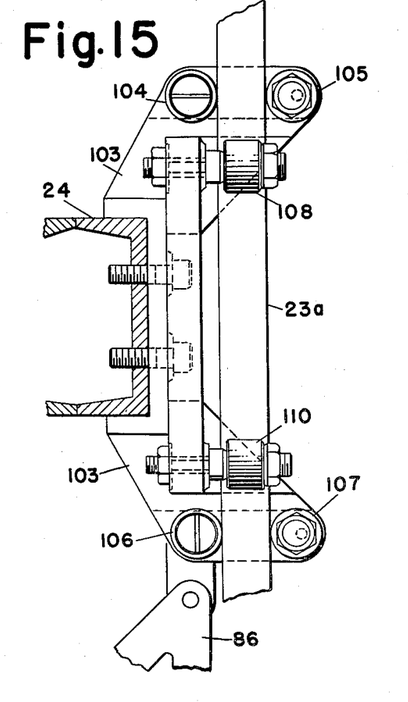
Fig. 15 is an enlarged view of the righthand portion of the anti-friction bearing which supports a tubular element of a suction head.
Figure 16:
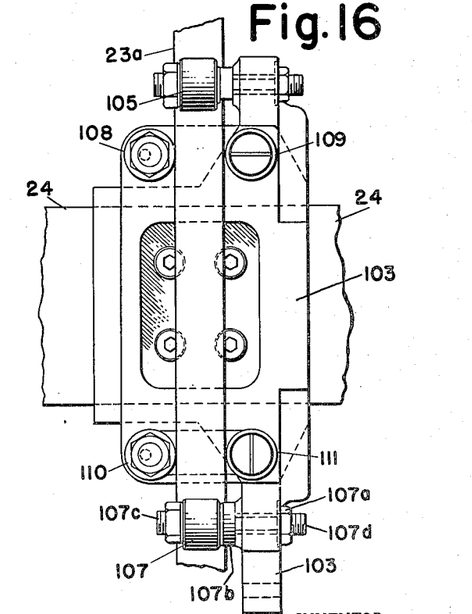
Fig. 16 is a side elevation taken from the righthand side of Fig. 15.

Each of the tubular elements is supported in like anti-friction bearings, one of which, the anti-friction bearing for the tube 23a, has been shown in detail in Figs. 15 and 16. Each anti-friction bearing includes a subframe 103 bolted or otherwise secured to the frame 24. To the subframe 103 are secured eight anti-friction rollers, the four rollers 104–107 engaging opposite faces of the rectangular tubular element 23a while the four rollers 108–111 engage the remaining opposing faces of the tubular element 23a. By locating the pairs of rollers 104 and 105, and 108 and 109 a substantial distance from rollers 106, 107 and 110 and 111, substantial bearing stability is provided for the tubular element 23a and it may be moved with little effort in a confined vertical path which remains unchanged during operation of the machine.

Adjustment of clearance between the rollers and tube 23a is accomplished by the eccentric disposition of the bearing-mounting studs with respect to the axis of each roller. Such eccentric mounting need only be provided for the rollers 105, 107, 108 and 110 though it may be included on all rollers if desired. The eccentricity of each mounting stud has been indicated by the eccentric location of the small broken-line circles on each bearing for the rollers 105, 107, 108 and 110. To adjust the roller 107 the nut 107a is loosened and a wrench applied to the squared shoulder portion 107b to rotate the roller-supporting bearing stud 107c with respect to the axis of the end 107d of stud 107c. Due to the eccentricity between 107a and 107d, the roller 107 may be moved toward or away from the adjacent side of tubular element 23a.

In Fig. 3 the crosshead frame 39 is shown in its lowermost position. The beginning of a cycle corresponds with crosshead frame 39 in its uppermost position.

The operation as a whole will be more readily understood by reference to the wiring diagram of Fig. 17, where there is included a schematic showing of the suction heads 10a and 11a in position for the initiation of a cycle. The automatically synchronized control for the application of suction and for the application of positive pressure is accomplished by the provision of a series of timing cams 115–118 secured to a shaft 119 indicated by the broken line, and driven by a chain 120 and a sprocket 121 secured to the main shaft 75 which is, of course, driven through the reduction gearing 71 by the motor 70. The arrangement is such that the shaft 119 is driven at the same speed as the main drive shaft 75 of Figs. 1–3. There are also provided cams 125–129 secured to a shaft 130, shown by the broken line, driven through reduction gearing comprising a worm 131 and a worm wheel 132 at a speed which is a fraction of that of the shaft 119.

With the supply lines 133 and 134 energized and with the circuit to the solenoids 83 and 84 closed by the cam-operated switch 127a, the cycle of operations is initiated by closing a manually operable switch 136 of the type which remains in the closed position until it is later manually opened, and by momentarily closing the starting switch 137, which is biased to its open position, to complete an energizing circuit for the operating coil 138 of the contactor 139 controlling the energization, from a suitable source of supply 140, of the operating motor 70. The starting circuit may be traced from the supply line 133 by the starting switch 137, the normally closed contacts of a "stop" switch 141, the contacts of the switch 136 and by the operating coil 138 to the other supply line 134. Upon closure of contactor 139, a holding circuit through bridging contact 136a is closed.

Upon rotation of the motor 70 the cam switch 127a is opened to release the latches or pawls from engagement with the suction heads and the cranks 44–47 are rotated in a clockwise direction from their uppermost positions to initiated the lowering of the crosshead frame 39 and to initiate the lowering, through the individual crossheads, Fig. 10, and the associated friction devices, of the several tubular elements, two of which, the elements 22a and 23a, are shown in Fig. 17. As the tubular elements 22a and 23a move their suction heads 10a and 11a downwardly, the cam 125 is rotated by shaft 130 to close the cam-actuated switch 125a to complete an energizing circuit for the operating coil 142 of the valve 142a which is moved to open position to apply suction from a line 143 extending from a vacuum pump to a header 144 from which there extends a flexible hose 145 which is secured to the upper end of tubular element 22a. A similar flexible hose 146 extends from the upper end of tubular element 23a to a second header 147 in which is located a valve 148a operable by a coil 148. It is to be understood that similar flexible connections lead from the headers 144 and 147 to each of the remaining suction heads of the apparatus. The headers 144 and 147 may also be connected through valves 149a and 150a, operated by coils 149 and 150, to a supply line 151 leading from a source of positive pressure, such as from a compressor or storage tank associated therewith.

When the tubular element 22a has lowered its suction head 10a to a position of rest upon the stack pile of negative plates 14 in the magazine 13a, Figs. 4–8, the valve 142a is opened to apply suction. The heads or cups 10a, 10b and 10c, Fig. 9, simultaneously suctionally grip a negative plate on stack pile 14.

As indicated in Figs. 4 and 9, the suction head 11a will not have secured thereto either a plate or a separator, but it will be lowered concurrently with the suction head 10a. The same is true of suction heads 11b and 11c.

It will be recalled that the shafts 48 and 49, Figs. 1–3, rotate at twice the speed of the main shaft 75. Through the continued rotation of shafts 48 and 49, the crank arms 44–47 are moved from their lowermost positions toward their uppermost positions. As the suction heads clear the upper levels of the magazines, the cams 33 and 34 bearing against the lower ends of the arms 25–28 are rotated about their pivotal supports to move the suction heads and associated translating structure as a whole to the right-hand position as indicated in Fig. 5. As they arrive in their registered positions in Fig. 5, the crank arms 44–47 and the frictional drives 22d–22f and 23d–23f, Fig. 10, are again effective to lower the suction heads, the suction head 11a moving downwardly into registering position over the stack pile of separators 20, Fig. 5, while the suction head 10a lowers the negative plate 14a on the conveyor 15. At the same time the heads 11b and 11c are lowered upon corresponding stack piles 20. As the suction heads reach their lowermost positions the cam-operated switch 115a is opened by the cam 115, and the cam-operating switches 116a and 117a are closed, the former completing an energizing circuit for the operating coil 148 to open the valve 148a to apply suction to the leader 147 and thence to suction head 11a. This circuit may be traced from the supply line 133 through the coil 148, the switch 116a, a switch 126a, which is now closed, to the other supply line 134.

The energization of coil 149 opens the valve 149a to apply air pressure to the head 10a, and to heads 10b and 10c, Fig. 9, to assure the release of each negative plate therefrom. The magnitude of the air pressure need not be particularly great and in some cases may not be necessary. However, the application of a slight amount of positive pressure assures the rapid and positive disengagement of each plate (or separator as the case may be) and avoids possibility of the dropping of a plate from a distance which would prevent accurate registration on the conveyor 15.

The cams 33 and 34, Figs. 1–3, have now been rotated through 180 degrees from the positions shown in the drawings. The cam followers 25a–28a again bear upon circular surfaces of the cams which provide periods of rest for the translating structure 24–28, during which time the elevating and lowering operations produced by the continuously rotating cranks 44–47 take place.

The arrow shown at the lower end of platform 52, Fig. 9, indicates the direction of movement during the initial operations already described. In manner later to be described, the magazines 17a–17c of platform 52 will be in registration with the transverse paths of movement of crossheads 12a–12c as the suction heads of the latter begin their downward movement.

Continuing with the operation, the crank arms 44–47 again lift the suction heads 10a and 11a, the heads 11a–11c now carrying separators from stack piles 20. When free of the magazines, they are transported into registered positions above the negative plates which have been located on the conveyor 15, one such plate being so shown in Fig. 5.

As the suction heads 10a and 11a are moved from their positions shown in Fig. 4 to their positions shown in Fig. 5, the magazines 17a and 18a are moving downwardly and during the time the suction heads 10a and 11a are moved from the positions of Fig. 5 to the positions of Fig. 6, the magazines 13a and 16a are moving upwardly so that upon arrival of the suction heads in their left-most positions, as viewed in Figs. 4–9, the stack piles of positive plates 19 are in registered position beneath the suction heads 10a–10c, Figs. 6 and 9. As before, the suction heads are lowered to deposit the separators from stack piles 20 on the negative plates, this being accomplished by the closure of the cam-operated switch 116a for closure of the valve 148a followed by the closure of the cam-operated switch 118a for energization of the operating coil 150 of the valve 150a which applies a positive fluid pressure to the suction heads 11a–11c forcibly to press each separator against the negative plate therebeneath.

Except for the positions of the magazines and the latching pawls, the parts have been returned to the positions shown in Figs. 1–3, that is, to positions where the cranks 44–47 are ready to elevate rods 40–43, and the crosshead frame 39. Accordingly, the suction heads are again elevated, the heads or cups 10a–10c each carrying a positive plate from stack piles 19.

The manner in which the platforms 52 and 53 move alternately to interchange the registered positions of adjacent stack piles with the transverse travel of the suction heads will best be seen from Figs. 1 and 9-A. Since the circular surface of cam 63 engages the cam follower 61a, the platform 52, to the rear of the machine, as viewed in Fig. 1, is stationary. The platform 53 on the near side of the machine, however, is moving, Fig. 9-A, to the left, since cam follower 62a is moving along a surface of decreasing radius. As the circular (lower end surface as viewed in Fig. 9-A) surface of cam 66 is moved beneath cam follower 62a, the lever 62 and platform 53 remain at standstill for movement of the suction heads into and out of the magazines then in registry therewith. Thus, it will be seen that the platforms 52 and 53 are alternately moved by the cams 63 and 66 between the periods of rest or standstill during which the suction heads lift plates and separators first from one magazine and then from the adjacent magazine. The cams 63 and 66 are displaced one from the other by ninety degrees to provide the proper timed or synchronous operation for the rest periods during which the crank arms 44–47 raise and lower the suction heads.

Figure 8:
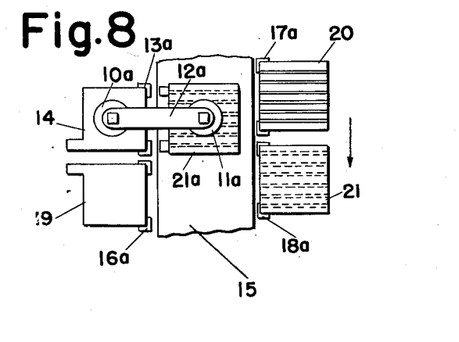

Again returning to the cycle of operations, the positive plates are lowered to conveyor 15, as in Fig. 7, followed by the delivery thereto of a separator, Fig. 8.

The foregoing operations continue until there has been deposited on the conveyor 15 a desired number of plates and separators.

Storage battery elements vary widely in the number of plates included therein. For example, they may be provided with four positive plates and five negative plates, five positive plates and six negative plates, and upwardly to as many as ten positive plates and eleven negative plates, or more.

The particular number of plates and separators to be assembled for each element is readily determined by the selection of the gear ratio between the shafts 119 and 130, Fig. 17, as by selection of the relative size of the worm 131 and the worm wheel 132. These may be replaceable as an assembly, and selected for storage battery elements with the desired number of component parts.

If it now be assumed that the gear ratio provided by worm 131 and worm wheel 132 has been selected for the assembly of eleven-plate storage battery elements, the foregoing operations will continue until there have been deposited by the suction heads 10a and 11a five positive plates and six negative plates with separators interposed therebetween. As the last separator is deposited, the parts will be in the positions shown in Fig. 8.

After release of the separator 21a, the cam-operated switch 126a, Fig. 17, will be moved to its open position to deenergize the operating coils 148 and 150 to prevent application of either suction or pressure to the suction head 11a. However, the suction head 10a and its associated valves 142a and 149a remain effective until after the final negative plate 14 has been deposited on the partially completed element, thus completing it. After the last negative plate has been so deposited, the parts then being in the position shown in Fig. 5, the cam-operated switch 125a is moved to its open position to open the control circuits of the operating coils 142 and 149 of the valves 142a and 149a controlling the suction head 10a.

As the suction heads are lifted to their uppermost positions shown in Figs. 3 and 17, the cam-operated switch 127a again closes to energize the solenoids 83 and 84 to latch the suction heads in their uppermost positions.

As the suction heads 10a–10c and 11a–11c are latched in their uppermost positions the cam-operated switch 129a is closed to complete an energizing circuit for the operating coil 152 of a contactor 153 to energize from a suitable source of supply 154 a motor 155 arranged to drive a shaft 156 and through suitable reduction gearing on gear box 157, Fig. 1, a sprocket 157a and a chain 158 to rotate a shaft 159 having secured thereto the conveyor driving sprockets 160. Threaded on the conveyor driving sprockets are chains 161 on which there are mounted a series of lugs 162 forming the supporting platform 15 for the storage battery elements stacked thereon by the suction heads. Each adjacent pair of lugs 162 has been shown of greater thickness than the intermediate lugs. Each assembled element, as shown by the broken lines indicating completed elements 170, 171 and 172 at the delivery station, is supported over an intermediate lug and upon the thicker lugs, the intermediate lugs providing space for insertion of an element-removing tool or clamp.

The conveyor chains 161 are threaded upon idler sprockets 173–175 and also are supported by guide rods 176 supported on posts 177–179 on which are also supported guide rails 180.

While the foregoing description has been largely in terms of the stacking of a single element, it will, of course, be understood that with the three pairs of suction heads, the three storage battery elements 170–172, Fig. 1, were simultaneously assembled. Upon energization of the conveyor motor 155, the three assembled elements were moved from the assembly station to the right, as viewed in Fig. 1, and brought to rest in spaced relation with the suction heads of the assembling machine, the position of rest having been designated as a discharge station.

The closure of the cam-operated switch 129a to start the conveyor motor 155 was but momentary. Immediately after it closed, a cam-operated switch 163a is closed by a cam 163 driven from the shaft 159 as indicated by the broken line in Fig. 17 to complete a holding circuit for the coil 152. Thus, the conveyor is energized until the cam-operated switch 163a is moved to the open position. When this occurs, the conveyor motor 155 is deenergized by contactor 153 and the conveyor comes to rest. To prevent overtravel of the conveyor due to the inertia of the moving parts, it will be found desirable to utilize an electrically operated brake which is normally biased against a brake wheel 165 and which is released upon energization of the motor 155, the operating coil being shown connected across a pair of supply lines leading to the motor 155. The conveyor comes to rest with the cam 163 in a position similar to that shown in Fig. 17 but advanced 90 degrees with respect thereto. The conveyor remains stationary until the cam-operated switch 129a is again closed after the completion of a further group of three storage battery elements.

As the conveyor is brought to rest, the cam 127 will have been rotated to a position to open the switch 127a. Immediately afterward the cam-operated switches 125a and 126a are again closed.

It will be recalled that the storage battery element was completely assembled by delivery of a negative plate thereto. That occurs as shown diagrammatically in Fig. 5. During rotation of cams 125-127 to produce the successive operations just described, the suction heads 10a and 11a are moved through their successive motions corresponding with those described in connection with Figs. 6-8. When the switches 125a and 126a are again closed and the switch 127a opened, the suction heads 10a and 11a will be in the position shown in Fig. 4. By reason of the fact suction could not be applied through the valve 148a to the suction head 11a, that suction head above the conveyor is empty, as will be suction heads 11b and 11c. On the other hand, the suction heads 10a-10c will be in position to be lowered to the stack piles of negative plates 14 preparatory to lifting therefrom the first negative plate to start the assembly of the next group of three storage battery elements.

The foregoing cycles, in each of which there is completed for each pair of suction heads a storage battery element, may be continued as long as desired.

In order that the machine may be brought to standstill with the parts in predetermined positions, which makes for ease in starting up and assures in all subsequent operations the initial deposit of a negative plate for the beginning of each element, the manually operable switch 136 has been provided.

By operating the switch 136 to the open position, the by-pass circuit normally established thereby around the cam-operated switch 128a is opened. The opening of the switch 136 does not affect any of the foregoing operations until after the conveyor has been energized to move completed elements from the machine and until the parts again assume the positions diagrammatically shown in Fig. 4. At that time the cam-operated switch 128a is opened by the cam 128 to deenergize the coil 138 of the contactor 139. That contactor thereupon opens to deenergize the motor 70 to stop the entire machine. The apparatus as a whole may be again started as has already been described and it will function continuously again to assemble storage battery elements for as long a period as may be desired, always beginning each element with a negative plate.

The continuously changing levels in the supply magazines, Fig. 9, due to the progressive removal of plates and separators therefrom and the replacement in groups by attendants, does not adversely affect the operation of the associated suction head for the reason that the friction drive provided for each of the tubular elements supporting the suction heads is effective to lower each suction head against the stack piles of plates and separators regardless of their height. As they come to rest against such stack piles, the frictional driving elements slide on the tubular elements. Thus, not only is there taken care of varying stack height, but also the resulting drag force is in a direction to press the suction heads against each stack pile until the associated suction-applying valves 142a and 148a have been opened to apply suction to the suction heads. Therefore, while the suction heads are pressed firmly against the stack piles, suction is applied and there is assurance that such suction will be effective to hold the plates and separators thereto. To this end, each suction head may preferably have a lip of resilient material such as soft rubber, either natural or synthetic, to take care of any unevenness, particularly in the case of the separators with the grooves facing toward the suction heads.

The frictional devices, Figs. 13 and 14, are also effective to overcome the natural resilience or elasticity of the elements on the conveyor as well as in the magazines. A stack pile, either of storage battery element or in the magazines, has sufficient elasticity to produce a substantial bounce or rebound of the suction heads were it not for the restraining action resulting from the provision of the frictional drives. The restraining action has been found highly effective not only to prevent rebound of the suction heads, but also to prevent dislodgment of the partially assembled elements on the conveyor which, it will be noted, are not held in place by side guides but are neatly stacked one above the other.

The frictional drive, since it is effective to press downwardly when the suction head has been brought to rest, maintains the partially assembled elements on the conveyor under pressure and thus it is possible, regardless of the length of time the suction heads are stationary, to provide the proper timing. In other words, in terms of degrees of rotation of the shaft 75, the suction-controlling valves 142a and 148a are closed and the pressure-applying valves 149a and 150a opened, at the same time in each cycle in terms of degrees of revolution of the shaft 75.

Inasmuch as the tubular elements 22a-22c and 23a-23c are driven through the medium of the friction devices 22d-22f and 23d-23f, it will be seen that as soon as the crank arms 44-47 change the direction of movement of the crosshead frame 39, that is, as soon as they tend to lift it or to lower it, the friction devices will immediately be effective to initiate the lifting or lowering of the tubular elements. Thus, the lifting of the suction heads always occurs as the crank arms 44-47 move from their lowermost positions and during the time when the vertical component of their rotary motion is a minimum. This means that the tubular elements 22a-22c and 23a-23c rise very slowly as they are leaving the stack piles and partially assembled elements, this provision again being of value in minimizing disturbances, particularly of the partially or wholly completed storage battery elements. The tubular elements 22a-22c and 23a-23c and their associated suction heads 10a-10c and 11a-11c are brought to rest in their uppermost positions either by the completion of the stroke of the crosshead frame 39 or by the engagement of the upper level of the suction heads with the stationary part of the frame members of the antifriction bearings, the friction elements thereafter sliding along the tubular elements in completion of the upward stroke.

It is to be understood that while the apparatus which has been described represents a preferred form of the invention, changes may be made therein without departing from the invention as set forth in the claims.

What is claimed is:

1. A machine for assembling storage battery elements comprising a movable platform, a plurality of magazines disposed in opposed pairs in laterally spaced positions on opposite sides of said platform and adapted to support a plurality of stacks of element components including plates and separators, at least one pair of suction heads, one suction head of which is spaced from the other suction head thereof a distance substantially the same as the lateral spacing of each magazine on the respective sides of said platform, structure for translating said suction heads between positions of registry first above said platform and one of said magazines disposed to one side of said platform and then in registry above said platform and one of said magazines on the other side thereof, structure for elevating and lowering said suction heads in each of their registered positions, movable supporting means for each magazine on the respective opposite sides of said platform, driving means for said movable supporting means for interchanging the positions of the pair of magazines on one side of said platform after each suction head has been elevated therefrom and prior to return of said suction head thereto for the assembly of storage battery elements with the components thereof in predetermined order in the assembly.

2. A machine for assembling storage battery elements comprising a movable platform, a plurality of magazines disposed in opposed pairs on opposite sides of said platform and adapted to support a plurality of stacks of element components including plates and separators, movable supporting means for the magazines on their respective sides of said platform for simultaneous bodily movement thereof, driving means operable to interchange the positions of adjacent magazines, each adjacent magazine being momentarily brought to rest adjacent an assembly station, a pair of suction heads, guiding structure for said suction heads bodily movable along a line of travel transversely of the path of movement of said magazines, driving means operable in timed relation with said first-named driving means for translating said guiding structure to move said suction heads first into registration at said assembly station with said platform and a magazine on one side of said platform and then into registration with said platform and a magazine on the other side thereof, the movement of said suction heads from one registered position to the other being at the same periodicity as the movement of said magazines for registration in succession with four of them, and means for lowering and elevating said suction heads in each of their registered positions and for applying suction thereto while in engagement with a component of a storage battery element in a magazine to lift the same therefrom and to deposit it in registered position on said platform to assemble the components of said storage battery element in predetermined order.

3. A machine for assembling storage battery elements comprising a movable platform, a plurality of magazines disposed in opposed pairs on opposite sides of said platform and adapted to support a plurality of stacks of element components including plates and separators, movable supporting means for the magazines on their respective sides of said platform for simultaneous bodily movement thereof, a first driving means operable to interchange the positions of adjacent magazines, each adjacent magazine being momentarily brought to rest adjacent an assembly station, a pair of suction heads, guiding structure for said suction heads bodily movable along a line of travel transversely of the path of movement of said magazines, a second driving means operable in timed relation with said first-named driving means for translating said guiding structure to move said suction heads first into registration at said assembly station with said platform and a magazine on one side of said platform and then into registration with said platform and a magazine on the other side thereof, the movement of said suction heads from one registered position to the other being at the same periodicity as the movement of said magazine for registration in succession with four of them, timing structure operable in timed relation with said second driving means, means operable under the control of said timing structure for restraining said suction heads in their elevated positions after deposit in registered position on said platform of a plate from one of said magazines which completes the assembly of a storage battery element, and third driving means operable under the control of said timing structure for moving the assembled storage battery element from said assembly station to a delivery station, said timing structure being thereafter effective to release said suction heads when one of them is again in registry over the magazine containing the plates from which the topmost plate of the element was theretofore removed.

4. A machine for assembling storage battery elements comprising a movable platform, a plurality of magazines disposed in opposed pairs on opposite sides of said platform and adapted to support a plurality of stacks of element components including plates and separators, a plurality of pairs of suction heads, one suction head of each pair of which is spaced from the other suction head thereof for simultaneous registry with said platform and one or the other of the magazines on the respective sides of said platform, movable supporting means for the magazines on the respective sides of said platform, driving means for said movable supporting means for interchanging at an assembly station the positions of adjacent magazines, structure for translating said suction heads along a path normal to the movement of said magazines and between positions of registry at said assembly station first above said platform and a magazine disposed to one side of said platform and then in registry above said platform and a magazine on the other side thereof, said driving means for said movable supporting means being operable in timed relation with the translation of said suction heads for interchanging the positions of the magazines on the other side of said platform during movement of the suction heads toward the other side thereof and prior to its return thereto, and structure for elevating and lowering the said suction heads in each of their registered positions for lifting a component from a stack and for subsequently lowering it into registered position on said platform to assemble in predetermined order the components of said storage battery element.

5. The combination set forth in claim 4 in which each pair of suction heads is provided with a restraining means, means operable in timed relation with said driving means for operating said restraining means to hold said suction heads in their uppermost positions for a time interval adequate for removal of assembled storage battery elements at an assembly station for each pair of suction heads.

6. The combination set forth in claim 4 in which there is associated with each suction head a pair of control valves, one for controlling the application of suction and the other for controlling application of a positive pressure, and means operable in timed relation with the driving structures for said suction heads for applying suction after each has been lowered into engagement with the stack of element components and for applying positive pressure to each said suction head after it has lowered such element component into registered position on said platform and has come to rest thereon, the application of said positive pressure being continued until each such suction head begins its upward movement thereby to prevent dislodgement of element components on said platform by upward movement of each suction head therefrom.

7. A machine for assembling storage battery elements comprising a conveyor movable along a predetermined path, a pair of magazines disposed on opposite sides of said conveyor and adapted to support stacks of element components including plates and separators, a pair of suction heads spaced one from the other in directions normal to the path of travel of said conveyor for simultaneous registry above said conveyor and above one or the other of the magazines on opposite sides of said conveyor, structure for translating said suction heads between positions of registry first above said conveyor and a magazine disposed to one side of said conveyor and then in registry above said conveyor and a magazine on the other side thereof, movable supporting means for the magazines on the respective opposite sides of said conveyor, driving means for said movable supporting means operable in timed relation with the said translating structure for interchanging the positions of the pair of magazines on each side of said platform at a time when said pair of suction heads has been moved out of registry therewith, structure for elevating and lowering said suction heads in each of their registered positions for placing in succession element components withdrawn in turn from the four magazines, the aforesaid operations being carried out continuously for assembly of storage battery elements with the desired number of components therein, control means operable after the completion of a predetermined number of cycles for temporarily interrupting operation of said suction heads, and means for controlling the movement of said conveyor during said temporary period of interruption for transporting a completed storage battery element to a delivery station.

8. The combination set forth in claim 7 in which there is provided cycle-terminating means movable between a cycle-continuing position and a cycle-terminating position for interrupting operation of said driving structures after completion of the assembly of a storage battery element.

9. A machine for assembling storage battery elements comprising conveyor means adapted to travel in a horizontal path, a plurality of magazines disposed in opposed pairs on opposite sides of said conveyor means and adapted to support a plurality of stacks of element components including plates and separators, said magazines having the same lateral spacing from said conveyor means, a pair of suction heads opposite two of said opposed pairs of magazines adapted to pick components from the tops of stacks therein and to deposit them on said conveyor means, the spacing between said suction heads providing for registration of one of said suction heads with said conveyor means when the other suction head is in registration with a laterally spaced magazine, driving structure for elevating and lowering said suction heads, linkage means for translating said suction heads between said positions of registry first above said conveyor means and one of said pairs of magazines and then in registry with said conveyor means and one of the pairs of magazines on the opposite side of said conveyor means, engagement of one of said suction heads against the component limiting lowering of said suction head, said driving structure including a frictional drive whereby operation of said driving structure is independent of the extent of movement of each suction head and thereby independent of the height of stacks in said magazine and the height of a partially assembled element on said conveyor means, movable supports for the magazines on their respective sides of said conveyor, driving structure for said supports, and means for synchronizing operation of said suction heads and operation of said driving structures for alternately interchanging the positions of adjacent pairs of magazines with respect to the line of travel of said suction heads, the interchange of positions of the magazines on one side of said conveyor occurring while the suction heads are disposed in the region of the magazines on the opposite side of said conveyor and vice versa.

10. A machine for assembling storage battery elements comprising a supply of element components comprising plates and separators, a suction head, a tubular element supporting said suction head, translating structure having an anti-friction bearing means for said tubular element for vertical movement thereof, means for moving said translating structure bodily to move said tubular element and suction head to positions of registry first above said supply means and then above an assembly station, driving structure vertically movable along the axis of said tubular element and including structure for applying a drag force thereto for moving the suction head against a component and for pressing it against such component by said drag force while at the same time permitting continued movement of said driving structure relative to said tubular element whereby operation of said driving structure is independent of the height of stacks in said supply means or at said assembly station, said drag force-applying structure being effective immediately upon upward movement of said tubular element to lift it and said suction head.

11. The combination set forth in claim 10 in which said translating structure has secured thereto tubular restraining means operable between a restraining position and a releasing position, and means controlling the operation of said restraining means for moving it to its restraining position to prevent lowering of said tubular element under the action of said drag force.

12. The combination set forth in claim 10 in which said tubular elements are of rectangular shape and in which said structure for applying a drag force comprises two arms having friction elements engaging opposite faces of said rectangular element, and adjustable spring means for biasing said friction elements against said faces.

13. The combination set forth in claim 10 in which there is provided a second tubular element and suction head adjacent the first, each of which is provided with a shoulder, a pair of latching members pivotally supported from said supporting structure and movable into and out of engagement with said shoulders, and operating structure carried by said supporting structure for moving said latching members into and out of engagement with said shoulders.

14. A machine for assembling storage battery elements comprising a conveyor, a pair of magazines laterally spaced from said conveyor on one side thereof, a second pair of magazines laterally spaced on the other side of said conveyor a distance equal to the space of said first pair, said magazines being adapted to support a plurality of stacks of element components including plates and separators, structure movable lengthwise of said conveyor for supporting said pairs of stacks, the structure for each pair being separately movable, a pair of suction heads spaced one from the other, structure for translating said suction heads along a path transversely of said conveyor and between positions of registry first above said conveyor and a magazine disposed to one side of said conveyor and then in registry above said conveyor and a magazine on the other side thereof, structure for elevating and lowering said suction heads in each of their registered positions, each of said suction heads having extending therefrom and in cooperation with said elevating structure a tubular element, driving means for said movable supporting means for interchanging the positions of the pair of magazines on one side of said conveyor with respect to the transverse path of movement of said suction heads and during a time when said suction heads are remote therefrom and for then interchanging the positions of the magazines on the other side of said conveyor while said suction heads are in positions remote therefrom, thereby to assemble in predetermined order on said conveyor said element components, the completion of a predetermined number of cycles building up on said conveyor an assembled element for a storage battery.

15. The combination set forth in claim 14 in which there are provided suction-applying and pressure-applying valves for the tubular elements for selective control of the application to said suction heads of suction and pressure respectively, control means for said valves operable in timed relation with said translating structure and said elevating and lowering structure for applying suction to each suction head as it is lowered into engagement with the uppermost component in one of said magazines and for applying pressure to each suction head after lowering of a component by such suction head into registered position on said conveyor, said valve-controlling means and said translating and elevating and lowering structures having a common drive shaft for operation in timed relation one with respect to the other.

16. The combination set forth in claim 15 in which additional control means are provided for said valve-controlling means for rendering the latter inoperative after completion of a predetermined number of operations thereof, means operable in timed relation with said additional control means for holding said suction heads in their uppermost positions for a predetermined time interval, and means operable during said predetermined time interval for driving said conveyor to move an assembled storage battery element from beneath the path of travel of said suction heads.

17. The combination set forth in claim 16 in which there is also included a cycle-terminating control device operable in timed relation with said additional control means for bringing to standstill said common drive shaft in a position preparatory to resumption of rotation thereof, and manual means operable to initiate resumed rotation of said drive shaft for further continued operation of the machine for the assembly of storage battery elements.

18. A machine for assembling storage battery elements comprising a plurality of magazines disposed in rows laterally spaced one from the other for supporting stack piles of element components, driving structure for each row of magazines for bodily moving it between predetermined limits, each said driving structure including means providing a time interval at each of said limits during which each row of magazines remains at standstill, component lifting means, and means for moving said component lifting means into and out of registration with first one and then another of said magazines while said magazines are at standstill.

19. The combination set forth in claim 18 in which said component lifting means comprises suction heads, and a suction head frame, means including crank arms periodically to raise and lower said frame, said moving means including translating structure disposed below said frame, guides extending between said frame and said structure to hold them in alignment, and cams for moving said structure, said guiding members and said suction head frame between predetermined positions, suction heads slidably supported by said structure and vertically movable by said suction head frame, said magazines disposed below the path of the suction heads at the respective limits of the translating movements of said suction heads for holding components of storage battery elements for removal by said suction heads.

20. The combination set forth in claim 18 in which said driving structure including means for alternately moving first one row of magazines and then the other row of magazines in timed relation with said lifting means, the movement of one row of magazines at least in part taking place while the lifting means is in registration with at least one magazine of the other row.

21. A machine having a repetitive cycle of operations which in each cycle assembles a storage battery element, comprising a conveyor, a row of magazines laterally spaced from one side of said conveyor, a second row of magazines laterally spaced from other side of said conveyor, a first driving structure for moving one row of magazines lengthwise of said conveyor first to one limit of movement and then to second limit of movement, component lifting means, means for moving said lifting means transversely of said conveyor and into a first magazine of said one row while the same is at one of its limits of movement, a second driving structure operable while said lifting means is in registered position with said first magazine for moving the other row of magazines between predetermined limits of movement, said driving structures being operable in timed relation with said lifting means through a plurality of cycles of operation of the kind specified above alternately to bring said lifting means into registration with four magazines two of them being disposed on the respective sides of said conveyor, latching means for holding said lifting means in an elevated position, means operable after completion of a cycle of operations for operating said latching means to hold said lifting means in the elevated position until registration of said lifting means with said first magazine which marks the beginning of a cycle, means for driving said conveyor after the latching of said lifting means to transport components received thereon to a discharge station, and means for releasing said latching mechanism after said lifting means has completed the remainder of the last cycle and prior to its movement to a position to initiate a new cycle of operations during which it is again brought into registration in succession with at least four of said magazines.

22. A machine for assembling storage battery elements comprising a movable platform, supply means disposed on each side of said platform in a laterally spaced position and adapted to support element components, at least one pair of suction heads, one suction head of which is spaced from the other suction head thereof a distance substantially the same as said lateral spacing, structure for translating said suction heads between positions of registry first above said platform and then above a selected element component of a supply means disposed to one side of said platform and then in registry above said platform and another selected element component in the supply means on the other side thereof, structure for elevating and lowering said suction heads in each of their registered positions, movable supporting means for supply means on the respective opposite sides of said platform, driving means for said movable supporting means for alternately moving the supply means to bring additional element components to positions of registry after each suction head has been elevated and prior to return of said suction head for the assembly of storage battery elements with the components thereof in predetermined order.

WILLIAM WHARTON SMITH.

No references cited.